United States Patent
Rogness et al.

(10) Patent No.: US 11,975,724 B2
(45) Date of Patent: May 7, 2024

(54) METHODS AND APPARATUS TO DETERMINE VEHICLE TRAILER WEIGHT

(71) Applicant: Ford Global Technologies, LLC, Dearborn, MI (US)

(72) Inventors: Anton Rogness, Dearborn, MI (US); Joshua Rajasingh, Ypsilanti, MI (US); Andrew Niedert, New Hudson, MI (US); Elliott Pearson, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 954 days.

(21) Appl. No.: 16/378,108

(22) Filed: Apr. 8, 2019

(65) Prior Publication Data
US 2020/0317212 A1 Oct. 8, 2020

(51) Int. Cl.
*B60W 40/13* (2012.01)
*B60D 1/24* (2006.01)
*G01G 19/12* (2006.01)

(52) U.S. Cl.
CPC ............. *B60W 40/13* (2013.01); *B60D 1/248* (2013.01); *G01G 19/12* (2013.01); *B60W 2300/14* (2013.01); *B60W 2530/10* (2013.01)

(58) Field of Classification Search
CPC ............. B60W 40/13; B60W 2300/14; B60W 2530/10; B60D 1/248; G01G 19/12
USPC .......................................................... 702/173
See application file for complete search history.

(56) References Cited

U.S. PATENT DOCUMENTS

| | | | |
|---|---|---|---|
| 9,796,227 B2 | 10/2017 | McAllister | |
| 9,956,965 B1 | 5/2018 | Hall et al. | |
| 2003/0154798 A1* | 8/2003 | Weyand | G01G 19/086 |
| | | | 73/760 |
| 2006/0293815 A1* | 12/2006 | McCann | B60G 17/01908 |
| | | | 701/37 |
| 2007/0181350 A1 | 8/2007 | Kranz et al. | |
| 2008/0012276 A1* | 1/2008 | Sugawara | G01G 19/4142 |
| | | | 701/45 |

(Continued)

FOREIGN PATENT DOCUMENTS

| CN | 202171500 | * | 3/2012 |
|---|---|---|---|
| DE | 10 2006 049 541 | | 4/2008 |

(Continued)

OTHER PUBLICATIONS

Five Factors That Can Affect Your Weighing System's Accuracy, Jan. 31, 2002, Hardy Solutions (Year: 2002).*

(Continued)

*Primary Examiner* — Elaine Gort
*Assistant Examiner* — Matthias S Weisfeld
(74) *Attorney, Agent, or Firm* — Lorne Forsythe; Hanley, Flight & Zimmerman, LLC (57) ABSTRACT

Methods, apparatus, systems and articles of manufacture are disclosed to determine vehicle trailer weight. An example apparatus includes a first sensor disposed on a hitch coupled to a vehicle to measure a first rate of change of a weight of the vehicle. The example apparatus also includes a second sensor disposed on a chassis of the vehicle to measure a second rate of change of the weight of the vehicle. The example apparatus also includes a controller to monitor the first rate of change and the second rate of change to determine if the vehicle is improperly loaded.

19 Claims, 5 Drawing Sheets

(56) References Cited

U.S. PATENT DOCUMENTS

| | | | | |
|---|---|---|---|---|
| 2010/0114437 A1* | 5/2010 | Boss | ...................... | B60K 28/08 |
| | | | | 701/48 |
| 2013/0253814 A1 | 9/2013 | Wirthlin | | |
| 2015/0323376 A1* | 11/2015 | Cullen | ..................... | B60D 1/24 |
| | | | | 701/124 |

FOREIGN PATENT DOCUMENTS

| | | |
|---|---|---|
| DE | 10 2012 012 321 | 8/2013 |
| DE | 10 2016 109 425 | 11/2017 |
| DE | 10 2016 208 618 | 11/2017 |

OTHER PUBLICATIONS

Brian Barton, How to Measure Tongue Weight, Dec. 15, 2014, Weigh Safe (Year: 2014).*
Five Factors That Can Affect Your Weighing System's Accuracy, Jan. 2002, Hardy Solutions (Year: 2002).*
Brian Barton, How to Measure Tongue Weight, Dec. 15, 2014, Weight Safe (Year: 2014).*
IQ Plus 210 Digital Weight Indicator Installation Manual, Jun. 2003, Rice Lake Weighing Systems (Year: 2003).*
My weight reading is drifting, how do I troubleshoot? Oct. 13, 2014, Hardy Solutions (Year: 2014).*
Doityourself Staff, How to Use a Digital Weight Scale, Jun. 23, 2010, Do It Yourself (Year: 2010).*
Janusz Gajda, Accuracy Analysis of WIM Systems Calibrated Using Pre-Weighted Vehicles Method, Dec. 2007, ResearchGate, Metrology and Measure Systems (Year: 2007).*

* cited by examiner

METHODS AND APPARATUS TO DETERMINE VEHICLE TRAILER WEIGHT

FIELD OF THE DISCLOSURE

This disclosure relates generally to determining vehicle weight and, more particularly, to methods and apparatus to determine vehicle trailer weight.

BACKGROUND

Drivers desire to know vehicle weight and/or vehicle weight distribution to improve loading practices and vehicle handling. Some vehicles include a hitch for towing. In some examples, the hitch can carry significant weight and is often associated with particular weight limits that should not be exceeded. To ensure proper vehicle performance when towing a trailer, the trailer is loaded such that a force imparted on the hitch corresponds to a certain proportion of the trailer weight and/or does not exceed a weight limit thereof. Improper loading of the hitch, either by intentional or unintentional means, can degrade the handling and/or reliability of the vehicle.

BRIEF DESCRIPTION OF THE DRAWINGS

The figures are not to scale. In general, the same reference numbers will be used throughout the drawing(s) and accompanying written description to refer to the same or like parts.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Some known vehicle monitoring systems utilize known suspension characteristics to calculate vehicle weight and/or trailer load (e.g., trailer weight). For example, known vehicle monitoring systems calculate a trailer load by subtracting the total vehicle weight with the trailer attached from the total vehicle weight without the trailer. However, such vehicle monitoring systems are unable to determine a weight that is being added to the vehicle while the trailer is being lowered onto a ball of a vehicle hitch (e.g., passengers entering the vehicle while the trailer is being attached, boxes being loaded into a bed of the vehicle, etc.). This can lead to inaccurate trailer load measurements, which may adversely affect the handling and/or operation of the vehicle.

A dedicated hitch load sensor may require significant modification to the hitch receiver and components for installation. For accurate strain gage applications, the strain gauge must be placed at the point of high stress, which may be difficult to install or may not be adequately protected from the surrounding environment. In some examples, a vehicle part may need to be weakened to provide enough stress for the strain gage to read accurately, which would negatively impact structural integrity of the vehicle. Additionally, most strain gage or pressure based applications are unable to correct for different lengths of hitch drawbar shanks and drops (e.g., different torque arms), which requires an operator to measure hitch components to correct for these hitch lengths.

Example methods and apparatus disclosed herein utilize a load sensor coupled to a hitch of a vehicle and on-board vehicle sensors (e.g., ride height sensors) to calculate weight information for a vehicle and/or a trailer. Examples disclosed herein include a first sensor (e.g., a hitch load sensor) disposed on a hitch coupled to a vehicle to measure a first rate of change of a weight of the vehicle (e.g., a load applied to the vehicle over a period of time, a change in total vehicle weight over time, etc.). In some examples, the first sensor is disposed in a receiver of the hitch. However, the first sensor can be any type of sensor located on any portion of the hitch that can detect a trailer load increasing or decreasing (e.g., a rate of change). For example, the first sensor may be a surface mounted strain gage of a gooseneck hitch, a pressure sensor mat in the hitch receiver of a standard ball weight carrying hitch, a pressure transducer, a low resolution load sensing bolt in a fifth wheel hitch, or a thin film load cell in the hitch receiver. In the disclosed examples, the first sensor does not measure the actual trailer load. As such, the first sensor does not have to be calibrated and/or accurate. Therefore, the first sensor can be placed in less than ideal locations because the first sensor only measures a rate of change (e.g., if the trailer load is increasing or decreasing).

Examples disclosed herein include a second sensor (e.g., a ride height sensor) disposed on a chassis of the vehicle to measure a second rate of change of the weight of the vehicle. In some examples, the second sensor may be disposed on any part of a chassis of the vehicle. For example, the second sensor may be a load cell disposed in a wheel spindle of the vehicle. In some examples, the second sensor is disposed on an axle of the vehicle. In some examples, the second sensor may be disposed on a spring seat of a MacPherson strut. Alternatively, the second sensor may be disposed on a spring seat of an axle of a leaf-spring suspension. However, the second sensor may be disposed on any type of suspension (e.g., a MacPherson strut, a leaf spring suspension, a Short Long Arms suspension, etc.) to measure a ride height of a vehicle. In examples disclosed herein, the ride height measured by the second sensor is utilized to measure a rate of change (e.g., vehicle weight increasing or decreasing).

In some examples, the second sensor is a plurality of sensors located on a suspension of the vehicle. For example, the plurality of sensors includes a first group (e.g., a set) of sensors positioned adjacent a front end of the vehicle (e.g., positioned on suspension components of a front axle of the vehicle), and a second group of sensors positioned adjacent a rear end of the vehicle (e.g., positioned on suspension components of a rear axle of the vehicle. Alternatively, the plurality of sensors may include four sensors disposed on four suspension components (e.g., a spring seat of a coil spring) of a vehicle (e.g., a first sensor on a first suspension component, a second sensor on a second suspension component, etc.). As such, each wheel of a vehicle may be associated with an individual ride height sensor.

Examples disclosed herein include a controller (e.g., a vehicle controller) to monitor the first rate of change from the first sensor and the second rate of change from the second sensor to determine if the vehicle is improperly loaded. For example, the controller monitors the first sensor to determine when to initiate a trailer load measurement sequence. The controller initiates the trailer load measurement sequence when a load is applied to the first sensor. During the trailer load measurement sequence, the controller determines an initial weight of the vehicle when the load is applied to the first sensor. For example, the controller determines an initial weight of the vehicle based on a summation of a first vehicle weight determined using the second sensors disposed on the front axle of the vehicle and a second vehicle weight determined using the second sensors disposed on the rear axle of the vehicle.

The controller subsequently monitors the first rate of change from the first sensor and the second rate of change from the second sensor to determine if the first rate of change is the same as the second rate of change (e.g., the first rate of change is increasing at the same rate as the second rate of change). If the controller determines that the first rate of change and the second rate of change are different, the controller may display a fault error message to an operator of the vehicle and/or generate an audible alarm indicating improper loading. If the first rate of change and the second rate of change are the same when they reach a steady state (e.g., the vehicle weight is no longer increasing or decreasing), the controller determines a final weight of the vehicle. For example, the controller may obtain outputs from the second sensors disposed on the suspension of the vehicle to determine the final weight. In some examples, the controller may combine (e.g., sum) the outputs from the second sensors disposed on the front axle of the vehicle and the second sensors disposed on the rear axle of the vehicle to determine the final weight of the vehicle. The controller further determines the trailer weight based on a difference between the initial weight of the vehicle and the final weight of the vehicle.

Examples disclosed herein eliminate the need for an operator to initiate a weighting sequence from a vehicle menu because the system is able to detect when a load, is applied to the hitch of a vehicle. Additionally, the system only requires the second sensors to be calibrated because the first sensor does not measure the actual load. As such, inexpensive strain gauges can be utilized with current hitch designs, and/or placed in locations that simplify manufacture of the vehicle and/or hitch assembly. Thus, there is no need to redesign hitch components. A fully dedicated hitch load sensor is not required for each type of hitch. Therefore, the disclosed examples differ from some known vehicle monitoring systems by eliminating i) hitch sensors that require a new hitch component, ii) separate calibration of hitch sensors, iii) new error states specific to a hitch sensor that requires calibration, and iv) potentially higher costs associated with manufacturing a vehicle.

Figure 1:
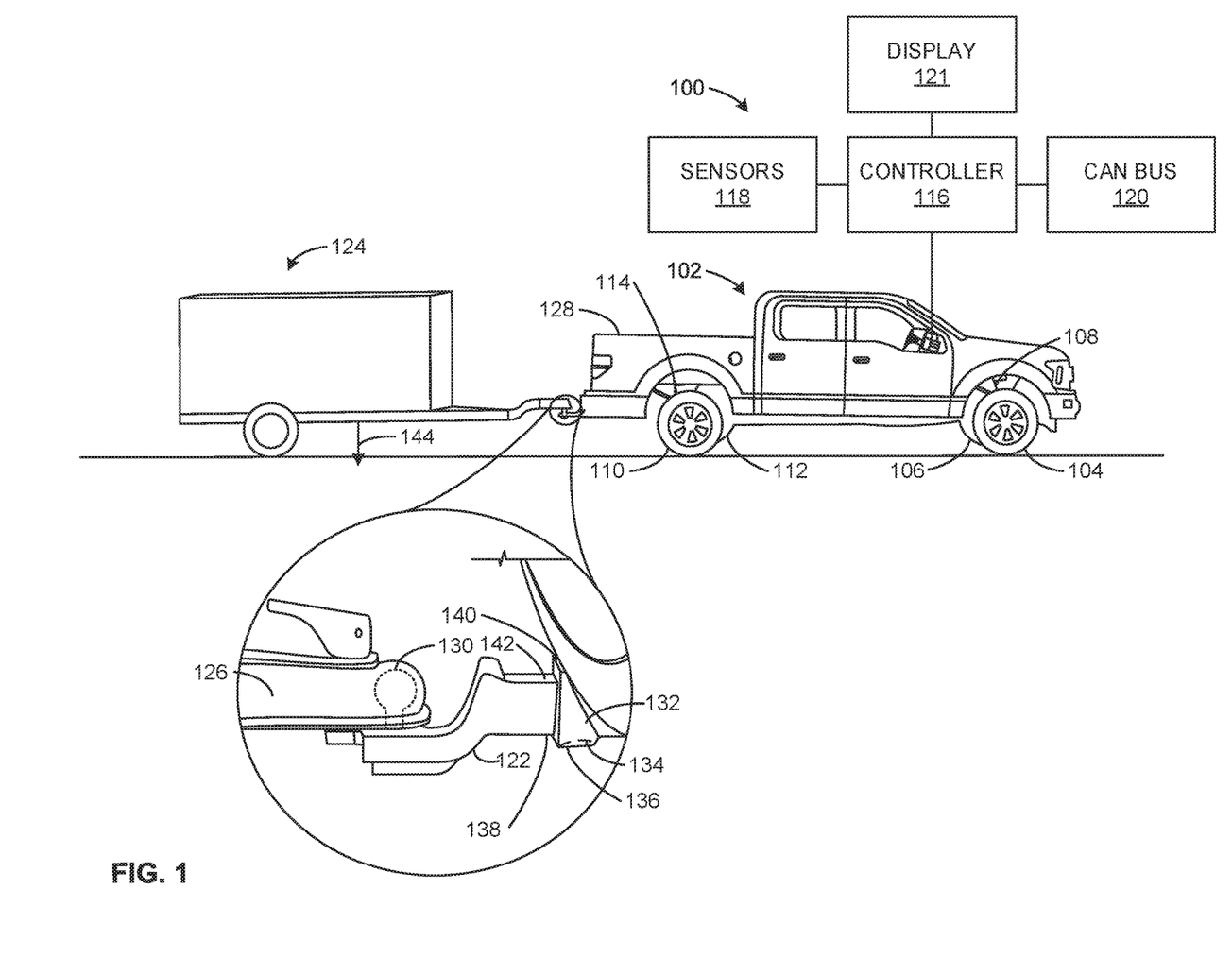
FIG. 1 represents an example environment in which the apparatus and methods disclosed herein may be implemented.

FIG. 1 represents an example environment 100 in which the apparatus and methods disclosed herein may be implemented. The example environment 100 includes an example vehicle 102. The vehicle 102 of the illustrated example is a truck. In some examples, the vehicle 102 is a car (e.g., a sedan), motorcycle, and/or any other vehicle having a suspension system and capable of towing a load. The vehicle 102 may be a body-on-frame construction or unibody construction.

The vehicle 102 of the illustrated example includes front wheels 104, 106 supported by a front suspension 108 and rear wheels 110, 112 supported by a rear suspension 114. The front suspension 108 associated with the front wheels 104, 106 provides steerability to the front wheels 104, 106. Likewise, the rear suspension 114 associated with the rear wheels 110, 112 can provide steerability to the rear wheels 110, 112. The example teachings of this disclosure may be implemented with any type of suspension (e.g., a steerable suspension, a non-steerable suspension) and/or any other types of vehicles.

In the illustrated example, the vehicle 102 includes a controller 116. The controller 116 receives information from systems of the vehicle 102 (e.g., a suspension system, powertrain, etc.) and determines vehicle weight information. As used herein, vehicle weight information includes any weight calculations and/or weight distribution calculations related to a vehicle and/or a trailer of a vehicle. For example, the controller 116 can calculate vehicle weight information that includes total vehicle weight, front axle weight, rear axle weight, cargo weight, passenger weight, fuel weight, wheel-end force, trailer coupler weight, and/or trailer weight.

The controller 116 of the illustrated example is communicatively coupled to sensors 118 and a controller area network (CAN) bus 120. In some examples, the sensors 118 include ride height sensors (e.g., a ride height sensor associated with each wheel end of the vehicle 102), and hitch load sensors (e.g., load sensors associated with a hitch of the vehicle 102). In some examples, a first sensor 118 (e.g., a hitch load sensor) is disposed on a hitch coupled to the vehicle 102 to measure a first rate of change of a weight of the vehicle 102. In some examples, the first sensor 118 is disposed in a receiver of the hitch. However, the first sensor 118 can be any type of sensor located on any portion of the hitch that can detect a trailer load increasing or decreasing (e.g., a rate of change). In some examples, a second sensor 118 (e.g., a ride height sensor) is disposed on a chassis of the vehicle to measure a second rate of change of the weight of the vehicle. In some examples, a first ride height sensor 118 is disposed on the front suspension 108 of the vehicle 102 and a second ride height sensor 118 is disposed on the rear suspension 114 of the vehicle 102. Alternatively, a set of ride height sensors 118 may be disposed on suspension components associated with each of the wheels 104, 106, 110, 112 respectively.

In some examples, the sensors 118 include other sensors that obtain data associated with the vehicle 102. The vehicle CAN bus 120 obtains data from systems of the vehicle 102 and provides the data to the controller 116. For example, the vehicle CAN bus 120 can transmit tire pressure data, steering angle data, wheel speed data, temperature data, and/or data from any system of the vehicle 102 (e.g., powertrain, anti-lock braking system, etc.

The controller 116 is further communicatively coupled to an example vehicle display 121. The vehicle display 121 displays information output by the controller 116 (e.g., total vehicle weight, front axle weight, trailer weight, etc.) to driver of the vehicle 102. In some examples, the vehicle display 121 displays warnings and/or alerts to the driver when the vehicle 102 is subjected to predetermined conditions (e.g., total weight exceeds a threshold, trailer coupler weight exceeds a threshold, etc.). In some such examples, the vehicle display 121 requests interaction from the driver of the vehicle 102 (e.g., pressing a button, entering a command, etc.). Additionally or alternatively, the vehicle display 121 can receive input from the driver of the vehicle 102 (e.g., requesting information, resetting weight information output, etc.).

In some examples, to implement towing for the vehicle 102, an example hitch 122 is coupled to the vehicle 102. In particular, the hitch 122 of FIG. 1 is to receive and/or movably couple to at least a portion of a trailer 124 (e.g., a trailer tongue 126). While the example of FIG. 1 depicts the hitch 122 as being a ball hitch (sometimes referred to as a mount ball hitch), in other examples, the vehicle 102 may be implemented with any other suitable hitch such as, for example, a weight distributing hitch, a fifth wheel hitch, a gooseneck hitch, etc. Accordingly, in some examples, the hitch 122 may be disposed on a different portion of the vehicle 102 such as in a vehicle bed 128.

In the illustrated example of FIG. 1, the trailer 124 is movably and/or operatively coupled to the vehicle 102 via the example hitch 122 interposed therebetween. In particular, to ensure proper performance and/or handling of the example vehicle 102 during use, the trailer tongue 126 of the trailer 124 imparts a certain force or load (sometimes referred to as tongue ball weight) on a ball 130 of the hitch 122, which ensures proper vehicle handling and/or maneuverability when driving. In the illustrated example, the vehicle 102 includes a hitch receiver 132 to receive the hitch 122. To measure a rate of change (e.g., an increase or decrease of the trailer 124 load), a sensor 134 (e.g., sensor 118) is disposed on a first end 136 in the hitch receiver 132. As such, the sensor 134 is in direct contact with a bottom portion 138 of the hitch 122 to measure a rate of change. Alternatively, the sensor 134 may be disposed on a second end 140 in the hitch receiver 132 to be in direct contact with an upper portion 142 of the hitch 122. In some examples, the sensor 134 may be positioned on the ball 130 to be in direct contact with the trailer tongue 126.

In other examples, the vehicle 102 may be associated with one or more other suitable trailers such as, for example, a gooseneck trailer. In such examples, as previously mentioned, the example vehicle 102 may be implemented with a gooseneck hitch and/or a fifth wheel instead of the example hitch 122 of the illustrated example. Further, in some example, the example trailer 124 receives or carries cargo, equipment, one or more other vehicles, etc.

The controller 116 monitors the changes in a trailer weight 144 measured at the hitch 122 (e.g., output of the sensors 118) to determine when the trailer weight 144 measured at the hitch 122 has reached steady state (e.g., is no longer increasing). The controller 116 monitors a first rate of change of the sensor 134 in comparison to a second rate of change of the second sensors 118 disposed on the front suspension 108 and the rear suspension 114.

The controller 116 monitors the first rate of change from the sensor 134 and the second rate of change from the second sensors 118 to determine if the vehicle 102 is improperly loaded. For example, the controller 116 monitors the sensor 134 to determine when to initiate a trailer load measurement sequence. The controller 116 initiates the trailer load measurement sequence when a load is applied to the sensor 134 (e.g., the trailer tongue 126 is lowered onto the ball 130). During the trailer load measurement sequence, the controller 116 determines an initial weight of the vehicle 102 when the load is applied to the sensor 134. For example, the controller 116 determines an initial weight of the vehicle 102 based on a summation of a first vehicle weight determined using the second sensors 118 disposed on the front suspension 108 (e.g., a front axle of the vehicle 102), and a second vehicle weight determined using the second sensors 118 disposed on the rear suspension 114 (e.g., a rear axle of the vehicle 102).

The controller 116 subsequently monitors the first rate of change from the sensor 134 and the second rate of change from the second sensors 118 to determine if the first rate of change is the same as the second rate of change (e.g., the first rate of change is increasing at the same rate as the second rate of change). If the controller 116 determines that the first rate of change and the second rate of change are different, the controller 116 may display a fault error message to an operator of the vehicle and/or generate an audible alarm indicating improper loading via the display 121. If the first rate of change and the second rate of change are the same prior to the vehicle weight reaching a steady state (e.g., the vehicle weight is no longer increasing or decreasing), the controller 116 determines a final weight of the vehicle 102. For example, the controller 116 may obtain outputs from the second sensors 118 disposed on the front suspension 108 and the rear suspension 114 of the vehicle 102 to determine the final weight. In some examples, the controller 116 may combine sum) the outputs from the second sensors 118 disposed on the front suspension 108 (e.g., the front axle of the vehicle 102) and the second sensors 118 disposed on the rear suspension 114 (e.g., the rear axle of the vehicle 102) to determine the final weight of the vehicle 102. The controller 116 further determines the trailer weight based on a difference between the initial weight of the vehicle and the final weight of the vehicle.

Figure 2:
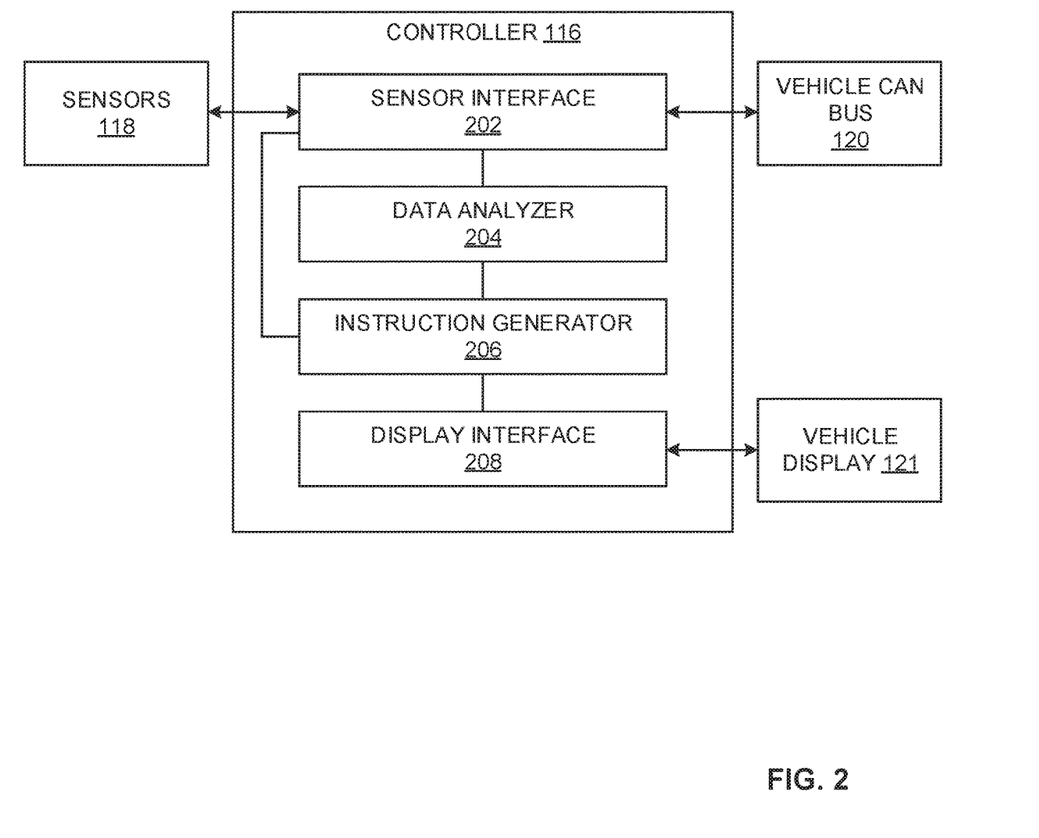
FIG. 2 is a block diagram of the example controller of FIG. 1

FIG. 2 is a block diagram of the example controller 116 of FIG. 1. The controller 116 of the illustrated example includes an example sensor interface example data analyzer 204, an example instruction generator 206, and an example display interface 208. In some examples, the sensor interface 202 is a means for interfacing a sensor, or a sensor interfacing means. In some examples, the data analyzer 204 is a means for analyzing data, or a data analyzing means. In some examples, the instruction generator 206 is a means for generating an instruction, or an instruction generating means. In some examples, the display interface is a means for interfacing a display, or a display interfacing means.

In operation, the sensor interface 202 is communicatively coupled to the sensors 118, 134 of FIG. 1. In some examples, the sensor interface 202 receives data from sensors 118, 134 located at a trailer hitch (e.g., the example hitch 122 of FIG. 1). In some such examples, the sensors 118, 134 located at the hitch 122 measure a change in a magnetic field. In some examples, the sensors 118, 134 located at the hitch 122 include load cells, hydraulic load cells, strain gauges, and/or any other load-measuring sensors. The sensor interface 202 is further communicatively coupled to the data analyzer 204 and transmits the data received from the sensors 118, 134 to the data analyzer 204.

The data analyzer 204 uses the data received from the sensor interface 202 to determine parameters associated with loading a vehicle (e.g., the vehicle 102 of FIG. 1). For example, the data analyzer 204 uses data from the sensors 118, 134 to calculate rate of change information (e.g., indicative of the trailer weight 144 of FIG. 1) associated with a trailer (e.g., the trailer 124 of FIG. 1). In some examples, the data analyzer 204 receives rate of change information from the sensor interface 202 that is measured by the sensors 118, 134 at the hitch 122 (e.g., load cells, hydraulic load cells, etc.). For example, load cells (e.g., the sensor 134) incorporated into the hitch 122 can measure trailer tongue loads (e.g., a load exerted on the hitch 122 of the vehicle 102 by the trailer tongue 126). In some examples, the load cells are oriented with respect to a direction of deflection to measure longitudinal and lateral loads. Additionally or alternatively, load cells can be placed between a body and a frame of the vehicle 102, between the frame and the hitch 122 of the vehicle 102, and/or between the hitch 122 and the hitch receiver 132 of the vehicle 102. In some examples, the data analyzer 204 receives data from the sensor interface 202 measured by a strain gauge. In some such examples, the strain gauges are coupled (e.g., adhered) to the hitch 122. The data received by the data analyzer 204 is then used to determine the rate of change of a trailer hitch load based on deflection of the hitch 122 due to the weight of the trailer 124 and/or cargo coupled and/or carried by the trailer 124. The data analyzer 204 monitors the load over time to determine the rate of change for the hitch 122. For example, the data analyzer 204 receives load information (e.g., outputs from the sensors 118, 134) and time stamps the load information. As such, the data analyzer 204 determines at a first time the load on the hitch 122 was 100 lbs., at a second time the load on the hitch 122 was 200 lbs., etc., for example.

To determine a rate of change for the on-board sensors (e.g., ride height sensors), the data analyzer 204 utilizes the data from the sensors 118 disposed on the front suspension 108 and the rear suspension 114 to determine a relationship between ride height data (e.g., an output voltage from ride height sensors) and weight (e.g., based on a force) at a wheel-end of the vehicle 102 (e.g., at one or more of the wheels 104-112). The data analyzer 204 determines the relationship between ride height and weight using one of two approaches: a component-level approach and a vehicle-level approach. In some examples, the component-level approach and/or the vehicle-level approach utilize build parameters to develop the relationship. As used herein, build parameters are characteristics of vehicle components that are specific to a make and model of a vehicle. In some examples, the build parameters are consistent across all vehicles of the same make and model.

When the data analyzer 204 determines the relationship using the component-level approach, the relationship between ride height and weight depends on a geometry of the suspension 108, 114 and/or properties of suspension components. For example, information is known about specific components of the suspension 108, 114, such as springs, bushings, dampers, and/or control arms. In some examples, the known information is a rate (e.g., a spring rate, a bushing rate, etc.) and/or hysteresis curves for the components. In some examples, the relationship of ride height and weight further depends on ride height sensor linkage geometry (e.g., a rotary suspension height sensor, a linear shock position sensor, etc.). The data analyzer 204 uses the properties of individual components of the suspension 108, 114 to develop the relationship between ride height and weight. In some examples, the relationship is expressed as an equation (e.g., weight as a function of ride height). Additionally or alternatively, the relationship can be expressed in a look-up table (e.g., returning a weight from the table based on a ride height input).

When the data analyzer 204 uses the vehicle-level approach, the data analyzer 204 determines the relationship based on measured ride heights (e.g., changes in ride height) at corners of the vehicle 102 when forces are applied to various locations on the vehicle 102. For example, predetermined forces can be applied at the front of the vehicle 102 (e.g., the front suspension 108), the rear of the vehicle 102 (e.g., the rear suspension 114), in the bed 128 of the vehicle 102, etc. and ride heights at each corner of the vehicle 102 can be measured. The measured data is then used to develop a relationship between ride height and weight. In some examples, the relationship is expressed as an equation. Additionally or alternatively, the relationship can be expressed as a look-up table.

When the relationship between ride height and weight is established, the data analyzer 204 enables calculation of a weight value (e.g., a load, a trailer load, etc.) associated with each wheel-end (e.g., at each wheel 104-112 of the vehicle 102), for example. Several methods for calculating the weight can be implemented by the data analyzer 204. Additionally or alternatively, the data analyzer 204 can use a look-up table to enable the weight associated with each wheel-end of the vehicle 102 to be determined (e.g., using the component-level approach or the vehicle-level approach).

The data analyzer 204 of the illustrated example uses the relationship between ride height and weight to enable calculations of weight associated with each wheel-end of the vehicle 102 (e.g., associated with each of the wheels 104-112). Further, the relationship developed by the data analyzer 204 enables the calculation of a final vehicle weight, front axle weight, rear axle weight, cargo weight, passenger weight, fuel weight, wheel-end force, trailer coupler weight, and/or trailer weight. For example, the total vehicle weight can be calculated by combining all of the weights (e.g., one for each wheel-end of the vehicle 102). In another example, the front axle weight can be calculated based on a combination of the weights associated with the front suspension 108 (e.g., the weight associated with the front wheels 104, 106). Similarly, the rear axle weight can be calculated, for example, by combining the weights associated with the rear suspension 114. In another example, the trailer load can be calculated based on a difference between an initial weight of the vehicle 102 (e.g., based on combining weights from the front suspension 108 and the rear suspension 114 prior to a load being applied to the vehicle 102) and a final weight of the vehicle 102 (e.g., based on combining weights from the front suspension 108 and the rear suspension 114 after the load has been applied to the vehicle 102).

In some examples, the data analyzer 204 obtains additional sensor data received via the sensor interface 202 by the vehicle CAN bus 120. The data analyzer 204 calculates compensation factors to be applied to the relationship in determining the initial and final weights of the vehicle 102. The compensation factors calculated by the data analyzer 204 adjust the relationship developed by the data analyzer 204 to account for conditions that influence the weight information calculations, including driving surface characteristics (e.g., grade), external factors (e.g., temperature, humidity, etc.), load sharing characteristics (e.g., anti-roll bar characteristics), driving characteristics (e.g., steering angle, fuel level, etc.), and/or vehicle lifecycle (e.g., vehicle age).

When the data analyzer 204 has determined the relationship between ride height and weight, the data analyzer 204 utilizes the relationship to monitor a rate of change (e.g., increase or decrease of trailer load over time.) for the on-board sensors (e.g., ride height sensors). That is, the data analyzer 204 monitors a rate of change for the load sensor (e.g., sensor 134) disposed on the hitch 122 and monitors a rate of change for the on-board sensors (e.g., sensors 118 disposed on the front suspension 108 and the rear suspension 114) to determine if the vehicle 102 is improperly loaded.

The data analyzer 204 of the illustrated example monitors a data relationship between the rates of change in a manner consistent with FIGS. 3A and 3B, discussed in detail below.

Figure 3A:
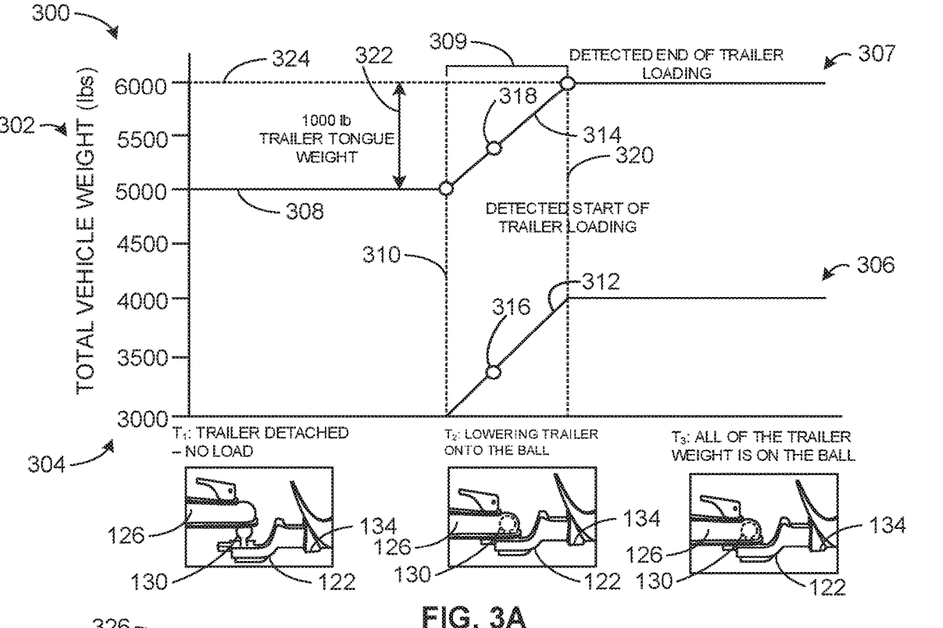
FIGS. 3A and 3B are graphs representative of output from the example controller of FIGS. 1 and 2.

Turning to FIG. 3A, a graph 300 represents outputs from the example controller 116 of FIGS. 1, and/or 2 while loading the trailer 124 (e.g., trailer tongue 126) onto the ball 130 of the hitch 122. The example graph 300 includes total vehicle weight 302 as a function of time 304 (e.g., a weight of the vehicle 102 has increased while loading the trailer 124 onto the hitch 122). In some examples, the total vehicle weight 302 is calculated by the data analyzer 204 of FIG. 2 using data collected by example sensors 118 of FIGS. 1 and 2. For example, the total vehicle weight 302 can be calculated by combining all of the weights (e.g., one for each wheel-end of the vehicle 102) as disclosed in connection with FIG. 2.

In the illustrated example of FIG. 3A, the graph 300 includes a first plot 306 and a second plot 307. The first plot 306 of the illustrated example corresponds to sensor data received by the sensor 134 while loading the trailer 124 (e.g., trailer tongue 126) onto the ball 130 of the hitch 122. As such, the first plot 306 represents the load measured by the sensor 134 (e.g., the hitch 122) over time. The second plot 307 of the illustrated example corresponds to sensor data received by the sensors 118 while loading the trailer 124 (e.g., trailer tongue 126) onto the ball 130 of the hitch 122. As such, the second plot 307 represents the load measured by the sensors 118 (e.g., the front suspension 108 and the rear suspension 114) over time. In the illustrated examples of FIGS. 3A and 3B, the first plot 306 is represented as increasing from 3000 lbs to 4000 lbs (e.g., a 1000 lb increase) over a period of time from T1-T3. However, the first plot 306 may start at any numerical value (e.g., 0, 5000, 7400, etc.) because the sensor 134 does not need to be calibrated.

In the example graph 300, at T1 (e.g., a first time) the total vehicle weight 302 starts at the known total weight 308 (e.g., an initial weight) of the vehicle 102 (e.g., 5000 lbs.) because the trailer tongue 126 is detached from the hitch 122 as is not imparting a load on the sensor 134. At T2 (e.g., a second time) the trailer tongue 126 is lowered onto the ball 130 of the hitch 122 and imparts a load on the sensor 134.

At T2, the data analyzer 204 initiates the trailer load measurement sequence 309 (e.g., indicated by line 310) to monitor the rate of change 312 of the load imparted on the hitch 122 via the sensor 134 and the rate of change 314 of the load imparted on the front suspension 108 and the rear suspension 114 via the sensors 118 disposed on the front suspension 108 and the rear suspension 114 of the vehicle 102. During the trailer load measurement sequence 309, the data analyzer 204 compares the rate of change 312 of the load imparted on the hitch 122 to the rate of change 314 of the load imparted on the front suspension 108 and the rear suspension 114. For example, the data analyzer 204 measures a load increase over time to determine if the rates of change 312, 314 are the same. The data analyzer 204 of the illustrated example selects point 316 on the rate of change 312 and selects point 318 on the rate of change 314 for comparison. Points 316 and 318 correspond to the same time period (e.g., 0-1 second after initiating the trailer load measurement sequence 309, 0-10 seconds after initiating the trailer load measurement sequence 309, etc.). As such, the data analyzer 204 compares the load measurements of points 316 and 318 at a specific time to determine a rate of change. In the illustrated example of FIG. 3A, point 316 corresponds to an approximate load increase of 300 lbs. and point 318 corresponds to an approximate load increase of 300 lbs.

Thus, the rate of change for the load imparted on the hitch 122 (e.g., measured by the sensor 134) and the load imparted on the front suspension 108 and the rear suspension 114 (e.g., measured by the sensors 118) are the same. As such, the data analyzer 204 will continue to monitor the rates of change 312, 314 until the trailer load measurement sequence 309 has concluded. For example, the data analyzer 204 may monitor any number of points along the rates of change 312, 314 (e.g., 20 points, 300, points, 450 points, etc.) to determine improper loading of the vehicle 102.

At T3 (e.g., a third time), the trailer tongue 126 is imparting the full load of the trailer 124 on the ball 130 of the hitch 122 and, thus, is imparting the full load of the trailer 124 on the sensor 134. The data analyzer 204 of the illustrated example ends the trailer load measurement sequence 309 (e.g., indicated by line 320). In some examples, the data analyzer 204 determines the trailer load 322 (e.g., trailer tongue weight) based on a difference between the initial weight 308 of the vehicle 102 (e.g., based on combining weights from the front suspension 108 and the rear suspension 114 prior to a load being applied to the vehicle 102) and a final weight 324 of the vehicle 102 (e.g., based on combining weights from the front suspension 108 and the rear suspension 114 after the load has been applied to the vehicle 102).

Figure 3B:
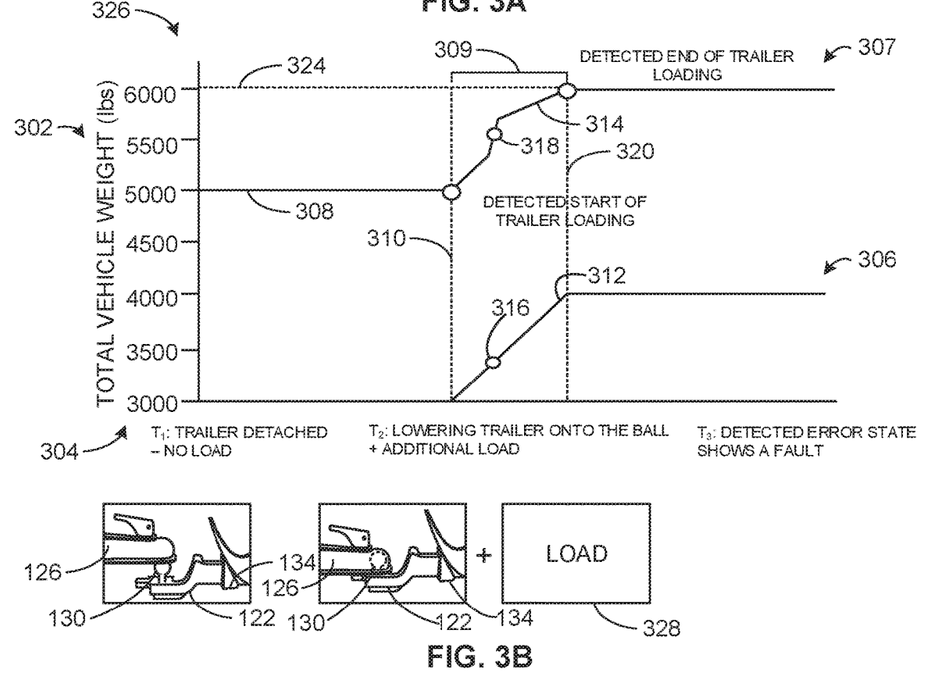

FIG. 3B illustrates a graph 326 that is similar to the graph 300. However, in contrast to the graph 300, at T2 an additional load 328 is added to the vehicle 102 while the trailer tongue 126 is being lowered onto the ball 130 of the hitch 122. For example, the additional load 328 may be a passenger entering the vehicle 102, a box being loaded into the bed 128 of the vehicle 102, etc. As such, during the trailer load measurement sequence 309, the data analyzer 204 determines that point 316 corresponds to an approximate load increase of 300 lbs and point 318 corresponds to an approximate load increase of 500 lbs. As such, the data analyzer 204 determines that the rates of change 312 and 314 are different and the data analyzer 204 initiates a sequence to display a fault error message to an operator of the vehicle 102. For example, the data analyzer 204 may display a fault error message to an operator of the vehicle via, the display 121 and/or generate an audible alarm indicating improper loading.

Turning back to FIG. 2, the data analyzer 204 is communicatively coupled to the instruction generator 206. The data analyzer 204 outputs the rate of change information to the instruction generator 206. In some examples, the data analyzer 204 continuously outputs the rate of change information to the instruction generator 206. In some alternative examples, the data analyzer 204 outputs the rate of change information (e.g., a change from a constant to an increasing trailer hitch load, a change from the increasing to generally constant trailer hitch load, etc.) to the instruction generator 206. In some examples, the instruction generator 206 transmits instructions and/or alarms to systems of the vehicle 102 based on the output from the data analyzer 204.

In some examples, the instruction generator 206 transmits instructions to a user interface of the vehicle display 121 to inform an operator that the vehicle 102 is being improperly loaded. For example, the instruction generator 206 instructs an operator of the vehicle via the vehicle display 121 that the vehicle 102 is being improperly loaded and the trailer 124 needs to be re-loaded onto the hitch 122. In some examples, the instruction generator 206 generates an audible alarm to indicate to the operator of the vehicle 102 that the trailer 124 is being improperly loaded onto the hitch 122.

The data analyzer 204 and/or the instruction generator 206 are further communicatively coupled to the display interface 208. As discussed above, the display interface 208 is further communicatively coupled to the vehicle display 121. The display interface 208 facilitates the transfer of information between the controller 116 and the operator of the vehicle 102. In some examples, the data analyzer 204 transmits rate of change information to the display interface 208. The display interface 208 further transmits the rate of change information to the vehicle display 121 where the rate of change information is displayed to the operator of the vehicle 102. In some examples, the rate of change information is displayed to the operator as a graph of total vehicle weight over time similar to the graphs shown in connection with FIGS. 3A and 3B. Additionally or alternatively, the rate of change information is displayed to the operator via other formats (e.g., as a numerical value(s)).

While an example manner of implementing the controller 116 of FIG. 1 is illustrated in FIG. 2, one or more of the elements, processes and/or devices illustrated in FIG. 2 may be combined, divided, re-arranged, omitted, eliminated and/or implemented in any other way. Further, the example sensor interface 202, the example data analyzer 204, the example instruction generator 206, the example display interface 208 and/or, more generally, the example controller 116 of FIG. 2 may be implemented by hardware, software, firmware and/or any combination of hardware, software and/or firmware. Thus, for example, any of the example sensor interface 202, the example data analyzer 204, the example instruction generator 206, the example display interface 208 and/or, more generally, the example controller 116 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor interface 202, the example data analyzer 204, the example instruction generator 206, the example display interface 208 and/or, more generally, the example controller 116 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example controller 116 of FIG. 1 may include one or more elements, processes and/or devices in addition to, or instead of, those illustrated in FIG. 2, and/or may include more than one of any or all of the illustrated elements, processes and/or devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
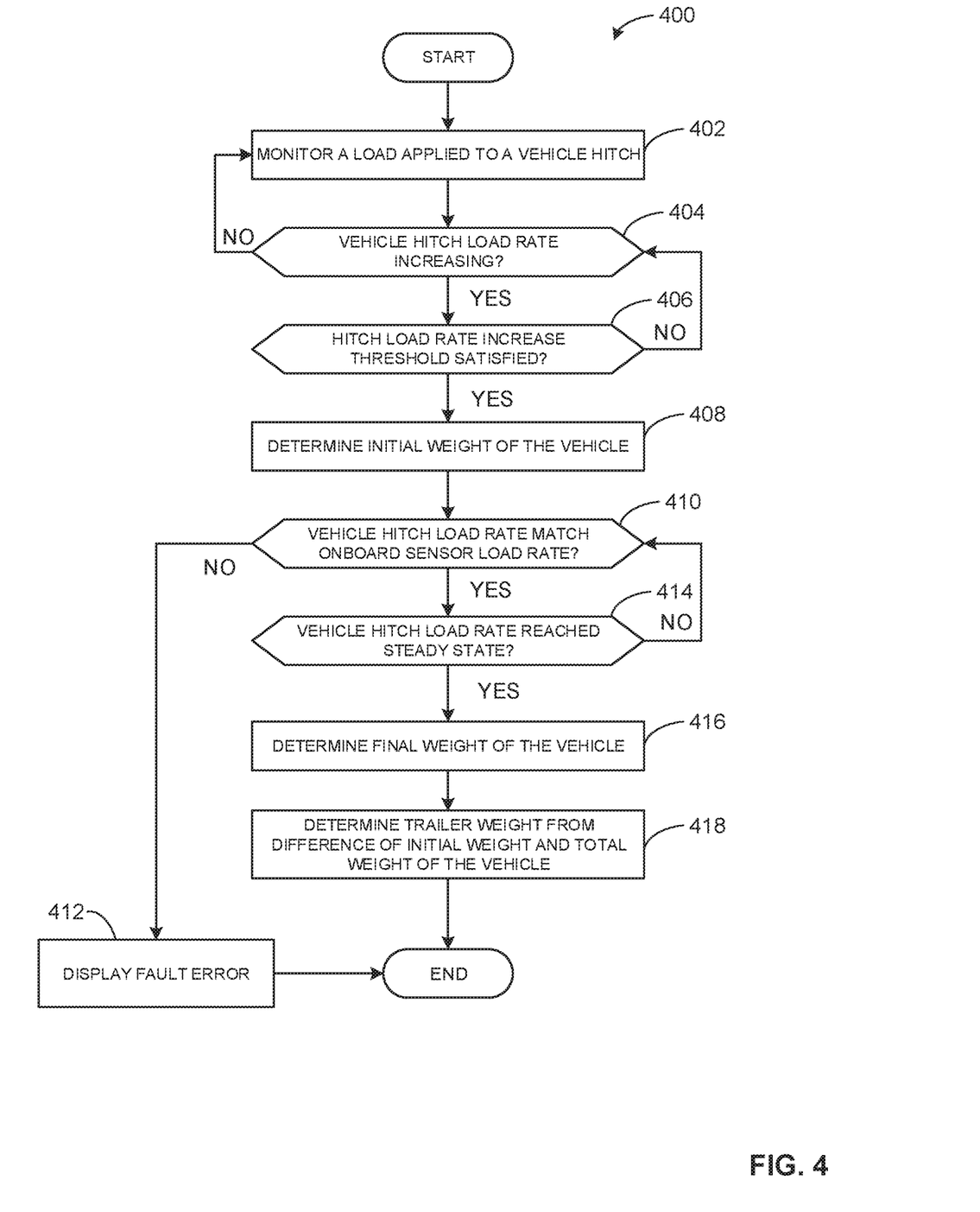
FIG. 4 is a flowchart representative of machine readable instructions that may be executed to implement the example controller of FIGS. 1 and/or 2 to determine the trailer load of a vehicle.

A flowchart representative of example hardware logic, machine readable instructions, hardware implemented state machines, and/or any combination thereof for implementing the controller 116 of FIG. 2 is shown in FIG. 4. The machine readable instructions may be one or more executable programs or portion(s) of an executable program for execution by a computer processor such as the processor 512 shown in the example processor platform 500 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 4, many other methods of implementing the example controller 116 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIG. 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 4 is a flowchart representative of machine readable instructions that may be executed to implement the example controller 116 of FIGS. 1 and/or 2 to determine a trailer weight (e.g., a trailer load). The example program 400 begins at block 402, where the controller 116 monitors a load applied to a vehicle hitch. For example, the sensor interface 202 monitors sensor data received from the sensors 118, 134 to monitor a load applied to the hitch 122 of the vehicle 102.

At block 404, the controller 116 determines if the vehicle hitch load is increasing. For example, the data analyzer 204 determines if a load is applied to the hitch 122 and if the load is increasing (e.g., a trailer tongue 126 is being lowered onto the hitch 122). If the controller 116 determines that the vehicle hitch load is not increasing, the program 400 returns to block 402. If the controller 116 determines that the vehicle hitch load is increasing, the program 400 proceeds to block 406. At block 406, the controller 116 determines if the hitch load rate threshold has been satisfied. For example, the data analyzer 204 determines if the hitch load is above a threshold weight 5 lbs, 20 lbs, 50 lbs, etc.) to initiate the trailer load measurement sequence. If the controller 116 determines that the hitch load rate threshold has not been satisfied, the program returns to block 404. If the controller 116 determines that the hitch load rate threshold has been satisfied, the program 400 proceeds to block 408.

At block 408, the controller 116 determines an initial weight of the vehicle. For example, the data analyzer 204 determines an initial weight of the vehicle 102 based on a summation of a first vehicle weight determined using the second sensors 118 disposed on the front suspension 108 (e.g., a front axle of the vehicle 102), and a second vehicle weight determined using the second sensors 118 disposed on the rear suspension 114 (e.g., a rear axle of the vehicle 102).

At block 410, the controller 116 determines if the vehicle hitch load rate matches an on-board sensor load rate. For example, the data analyzer 204 monitors the first rate of change (e.g., vehicle hitch load rate) from the sensor 134 and the second rate of change (e.g., on-board sensor load rate) from the sensors 118 to determine if the first rate of change is the same as the second rate of change (e.g., the first rate of change is increasing at the same rate as the second rate of change). If the controller 116 determines that the first rate of change and the second rate of change are different, the controller 116 displays a fault error message (block 412). For example, the instruction generator 206 may display a fault error message to an operator of the vehicle 102 and/or generate an audible alarm indicating improper loading. If the controller 116 determines that the first rate of change and the second rate of change are the same, the program 400 proceeds to block 414.

At block 414, the controller 116 determines if the vehicle hitch load rate reached a steady state. For example, the data analyzer 204 determines if the vehicle weight is no longer increasing or decreasing. If the controller 116 determines that the vehicle hitch load rate has not reached steady state, the program 400 returns to block 410. If the controller 116 determines that the vehicle hitch load rate has reached steady state, the program 400 proceeds to block 416.

At block 416, the controller 116 determines a final weight for the vehicle. For example, the data analyzer 204 may combine (e.g., summate) the outputs from the second sensors 118 disposed on the front suspension 108 (e.g., the front axle of the vehicle 102) and the second sensors 118 disposed on the rear suspension 114 (e.g., the rear axle of the vehicle 102) to determine the final weight of the vehicle 102.

At block 418, the controller 116 determines a trailer weight from a difference between the initial weight and the total weight of the vehicle. For example, the data analyzer 204 determines the trailer weight (e.g., trailer load) based on a difference between the initial weight of the vehicle 102 prior to the trailer 124 being loaded onto the hitch 122 and the final weight of the vehicle 102 after the trailer 124 has been loaded onto the hitch 122. The program 400 ends when the trailer 124 has been de-coupled from the hitch 122 or has imparted the full load of the trailer 124 onto the hitch 122.

Figure 5:
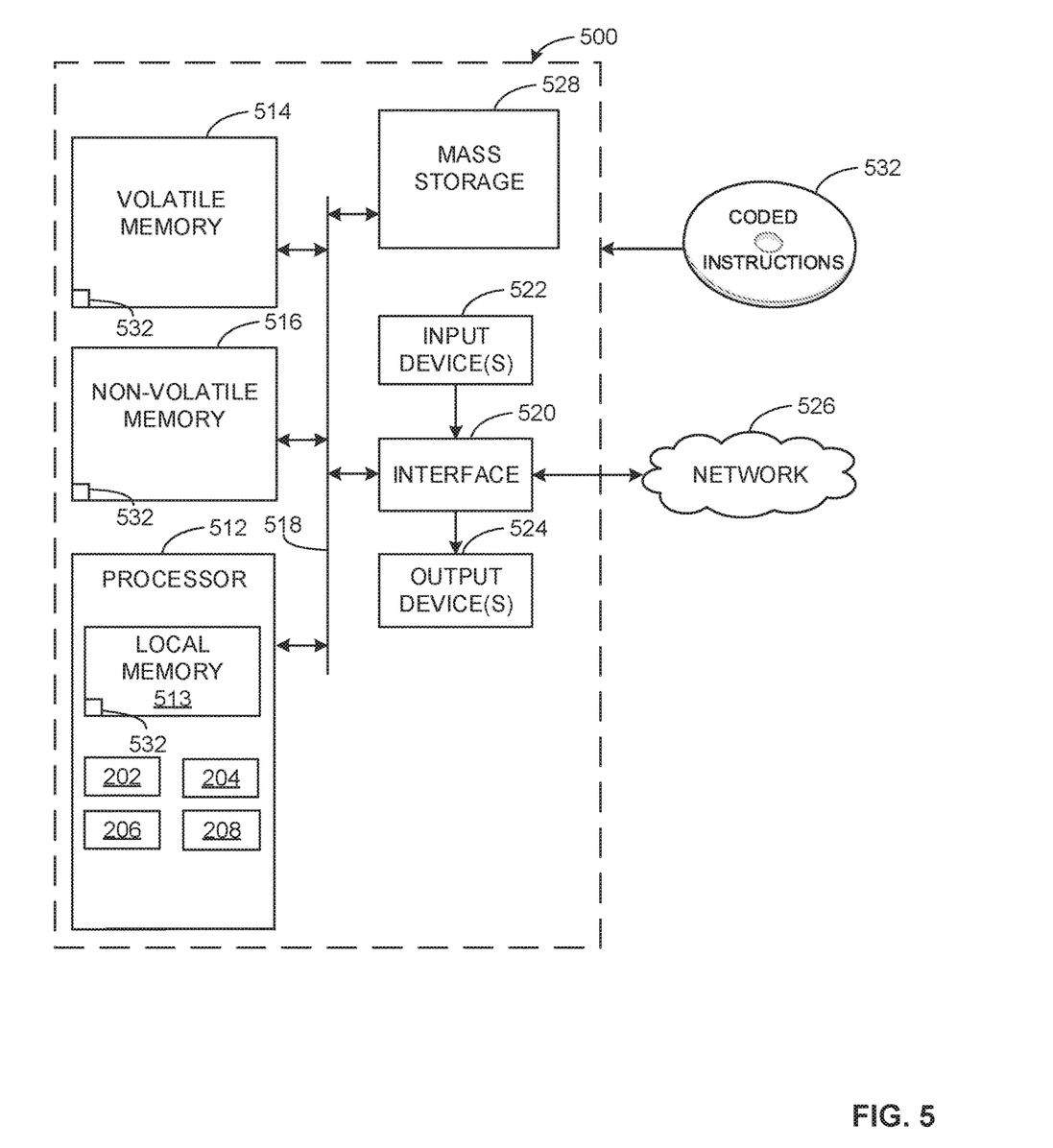
FIG. 5 is a block diagram of an example processing platform structured to execute the instructions of FIG. 4 to implement the example controller of FIGS. 1 and/or 2.

FIG. 5 is a block diagram of an example processor platform 500 structured to execute the instructions of FIG. 4 to implement the controller 116 of FIGS. 1 and/or 2. The processor platform 500 can be, for example, a server, a personal computer, a workstation, a self-learning machine (e.g., a neural network), a mobile device e.g., a cell phone, a smart phone, a tablet such as an iPad™), a personal digital assistant (FDA), an Internet appliance, a DVD player, a CD player, a digital video recorder, a Blu-ray player, a gaming console, a personal video recorder, a set top box, a headset or other wearable device, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example sensor interface 202, the example data analyzer 204, the example instruction generator 206, and the example display interface 208.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic. Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives.

The machine executable instructions 532 of FIG. 4 may be stored in the mass storage device 528, in the volatile memory 514, in the non-volatile memory 516, and/or on a removable non-transitory computer readable storage medium such as a CD or DVD.

From the foregoing, it will be appreciated that example methods, apparatus and articles of manufacture have been disclosed that mitigate an operator from initiating a weighting sequence from a vehicle menu because the system is able to detect when a load is applied to the hitch of a vehicle. Additionally, the system only requires sensors disposed on the suspension components to be calibrated because the hitch load sensor does not measure the actual load. As such, inexpensive strain gauges can be utilized with current hitch designs, and/or placed in easy to-manufacture locations. Thus, there is no need to redesign hitch components. A fully dedicated hitch load sensor is not required for each type of hitch. Therefore, the disclosed examples differ from some known vehicle monitoring systems by eliminating i) hitch sensors that require a new hitch component, ii) separate calibration of hitch sensors, iii) new error states specific to a hitch sensor that requires calibration, and iv) potentially higher costs associated with manufacturing a vehicle.

Example 1 includes an apparatus comprising a first sensor disposed on a hitch coupled to a vehicle to measure a first rate of change of a weight of the vehicle, a second sensor disposed on a chassis of the vehicle to measure a second rate of change of the weight of the vehicle, and a controller to monitor the first rate of change and the second rate of change to determine if the vehicle is improperly loaded.

Example 2 includes the apparatus of example 1, wherein the first sensor is disposed in a receiver of the hitch.

Example 3 includes the apparatus of any one of examples 1-2, wherein the controller monitors the first sensor to determine when to initiate a trailer load measurement sequence.

Example 4 includes the apparatus of any one of examples 1-3, wherein the controller is to perform the trailer load measurement sequence by determining an initial weight of the vehicle when a load is applied to the first sensor, monitoring the first rate of change and the second rate of change to determine if the first rate of change is the same as the second rate of change, and determining a final weight of the vehicle when the first rate of change and the second rate of change reach a steady state.

Example 5 includes the apparatus of any one of examples 1-4, wherein the controller is to determine a trailer weight based on a difference between the initial weight and the final weight.

Example 6 includes the apparatus of any one of examples 1-5, wherein the controller is to display a fault error message when the first rate of change and the second rate of change are different.

Example 7 includes an apparatus comprising a controller to determine an initial weight of a vehicle when a load is applied to a hitch of the vehicle, monitor a first rate of change of a weight of the vehicle and a second rate of change of the weight of the vehicle while the load is applied to the hitch of the vehicle, and determine a final weight of the vehicle when the first rate of change and the second rate of change reach a steady state.

Example 8 includes the apparatus of example 7, wherein the first rate of change is determined by monitoring a first sensor located on the hitch of the vehicle.

Example 9 includes the apparatus of any one of examples 7-8, wherein the second rate of change is determined by monitoring a plurality of sensors located on a suspension of the vehicle.

Example 10 includes the apparatus of any one of examples 7-9, wherein the plurality of sensors include a first group of sensors positioned adjacent a front end of the vehicle and a second group of sensors positioned adjacent a rear end of the vehicle.

Example 11 includes the apparatus of any one of examples 7-10, wherein the controller combines outputs of the first group of sensors and the second group of sensors to determine the final weight of the vehicle.

Example 12 includes the apparatus of any one of examples 7-11, wherein the controller is to display a vehicle fault error message when the first rate of change and the second rate of change are different.

Example 13 includes the apparatus of any one of examples 7-12, wherein the controller is to determine a trailer load of the vehicle based on a difference between the initial weight of the vehicle and the final weight of the vehicle.

Example 14 includes an apparatus comprising a first sensor coupled to a hitch of a vehicle, a set of sensors coupled to a suspension system of the vehicle, and a controller to determine a trailer load based on rate of change outputs from the first sensor and the set of sensors.

Example 15 includes the apparatus of example 14, wherein the rate of change outputs include a first rate of change from the first sensor, and a second rate of change from the set of sensors.

Example 16 includes the apparatus of any one of examples 14-15, wherein the controller is to monitor the rate of change outputs from the first sensor and the set of sensors to determine if the rate of change outputs are increasing at the same rate.

Example 17 includes the apparatus of any one of examples 14-16, wherein the set of sensors includes a first sensor and a second sensor positioned on suspension components of a front axle of the vehicle, and a third sensor and a fourth sensor positioned on suspension components of a rear axle of the vehicle.

Example 18 includes the apparatus of any one of examples 14-17, wherein the controller is to determine an initial weight of the vehicle based on a summation of a first vehicle weight determined using the first and second sensors and a second vehicle weight determined using the third and fourth sensors.

Example 19 includes the apparatus of any one of examples 14-18, wherein the controller is to determine a final weight of the vehicle based on a summation of the first and second vehicle weights.

Example 20 includes the apparatus of any one of examples 14-19, wherein the controller is to determine the trailer load based on a difference between the initial weight of the vehicle and the final weight of the vehicle.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a first sensor disposed on a hitch coupled to a vehicle to measure a first rate of change of a weight of the vehicle;
a second sensor disposed on a chassis of the vehicle to measure a second rate of change of the weight of the vehicle; and
a controller to:
initiate a trailer load measurement sequence corresponding to a coupling of a trailer to the hitch; and
continuously monitor during the trailer load measurement sequence the first rate of change and the second rate of change, the controller to determine if a fault occurred during the trailer load measurement sequence by identifying a difference between the first rate of change and the second rate of change over the trailer load measurement sequence, the fault indicative of at least one of a passenger entering the vehicle or cargo being placed in the vehicle during the trailer load measurement sequence.

2. The apparatus of claim 1, wherein the first sensor is disposed in a receiver of the hitch.

3. The apparatus of claim 1, wherein the controller is to initiate the trailer load measurement sequence in response to identifying a change in a second output of the first sensor.

4. The apparatus of claim 1, wherein the controller is to perform the trailer load measurement sequence by:
determining an initial weight of the vehicle when a load is applied to the first sensor;
monitoring the first slope and the second slope to determine if the first slope is the same as the second slope; and
determining a final weight of the vehicle when the first slope and the second slope reach a steady state.

5. The apparatus of claim 4, wherein the difference is a first difference, and the controller is to determine the trailer weight based on a second difference between the initial weight and the final weight.

6. The apparatus of claim 1, wherein the controller is to display an error message when the first slope and the second slope are different.

7. An apparatus comprising:
a controller to:
determine an initial weight of a vehicle;
initiate a trailer load measurement sequence corresponding to a coupling of a trailer to a hitch of the vehicle;
monitor continuously for the trailer load measurement sequence a first rate of change of a weight of the vehicle and a second rate of change of the weight of the vehicle while a load is applied to the hitch of the vehicle;
compare the first rate of change and the second rate of change;
in response to determining the first rate of change is the same as the second rate of change, determine a final weight of the vehicle when the first rate of change and the second rate of change reach a steady state; and
in response to determining the first rate of change is not the same as the second rate of the change, determine a fault occurred during the trailer load measurement sequence, the fault indicative of at least one of a passenger entering the vehicle or cargo being placed in the vehicle during the trailer load measurement sequence.

8. The apparatus of claim 7, wherein the first sensor is located on the hitch of the vehicle.

9. The apparatus of claim 7, wherein the plurality of sensors are located adjacent to a suspension of the vehicle.

10. The apparatus of claim 9, wherein the plurality of sensors include a first group of sensors positioned adjacent a front end of the vehicle and a second group of sensors positioned adjacent a rear end of the vehicle.

11. The apparatus of claim 10, wherein the controller combines outputs of the first group of sensors and the second group of sensors to determine the final weight of the vehicle.

12. The apparatus of claim 7, wherein the controller is to display a vehicle error message when the first slope and the second slope are different.

13. The apparatus of claim 7, wherein the controller is to determine the weight of the trailer based on a second difference between the initial weight of the vehicle and the final weight of the vehicle.

14. An apparatus comprising:
a first sensor coupled to a hitch of a vehicle;
a set of sensors coupled to the vehicle; and
a controller to:
initiate a trailer load measurement sequence corresponding to a coupling of a trailer to the hitch; and
determine a trailer load based on rate of change outputs from the first sensor and the set of sensors continuously monitored over a period of time, the controller to determine if a fault occurred during the trailer load measurement sequence by identifying a difference between a first rate of change output from the first sensor and a second rate of change output from the set of sensors, the fault indicative of at least one of a passenger entering the vehicle or cargo being placed in the vehicle during the trailer load measurement sequence.

15. The apparatus of claim 14, wherein the programmable circuitry is to monitor the slopes of the outputs from the first sensor and the set of sensors to determine if the slopes of the outputs are the same.

16. The apparatus of claim 14, wherein the set of sensors includes a fifth sensor and a second sensor positioned on first suspension components of a front axle of the vehicle, and a third sensor and a fourth sensor positioned on second suspension components of a rear axle of the vehicle.

17. The apparatus of claim 16, wherein the programmable circuitry is to determine an initial weight of the vehicle based on a first summation of a first vehicle weight determined using the fifth and second sensors and a second vehicle weight determined using the third and fourth sensors.

18. The apparatus of claim 17, wherein the programmable circuitry is to determine a final weight of the vehicle based on a second summation of the first and second vehicle weights.

19. The apparatus of claim 18, wherein the difference is a first difference, and the programmable circuitry is to determine the trailer load based on a second difference between the initial weight of the vehicle and the final weight of the vehicle.

* * * * *

UNITED STATES PATENT AND TRADEMARK OFFICE
CERTIFICATE OF CORRECTION

PATENT NO. : 11,975,724 B2
APPLICATION NO. : 16/378108
DATED : May 7, 2024
INVENTOR(S) : Rogness et al.

It is certified that error appears in the above-identified patent and that said Letters Patent is hereby corrected as shown below:

In the Claims

In Column 18, Claim 3, Line 15, delete "a second" and insert --an--.
In Column 18, Claim 4, Line 20, delete both instances of "slope" and insert --rate of change--.
In Column 18, Claim 4, Line 21, delete both instances of "slope" and insert --rate of change--.
In Column 18, Claim 4, Line 24, delete both instances of "slope" and insert --rate of change--.
In Column 18, Claim 5, Line 26, delete "the" and insert --a--.
In Column 18, Claim 6, Line 30, delete "an" and insert --a fault--.
In Column 18, Claim 6, Line 30, delete "slope" and insert --rate of change--.
In Column 18, Claim 6, Line 31, delete "slope" and insert --rate of change--.
In Column 18, Claim 9, Line 56, delete "wherein the plurality of" and insert --wherein the second rate of change is--.
In Column 18, Claim 9, Line 57, delete "sensors are" and insert --determined by monitoring a plurality of sensors--.
In Column 18, Claim 12, Line 66, delete "vehicle error" and insert --vehicle fault error--.
In Column 18, Claim 12, Line 66, delete "slope" and insert --rate of change--.
In Column 18, Claim 12, Line 67, delete "slope" and insert --rate of change--.
In Column 19, Claim 13, Line 2, delete "the weight of the trailer" and insert --a trailer load of the vehicle--.
In Column 19, Claim 15, Line 23, delete "programmable circuitry" and insert --controller--.
In Column 19, Claim 15, Line 24, delete "slopes" and insert --rate--.
In Column 19, Claim 15, Line 24, delete "the" and insert --change--.
In Column 20, Claim 15, Line 1, delete "slopes of" and insert --rate of change--.
In Column 20, Claim 15, Line 2, delete "are the same" and insert --are increasing at the same rate--.
In Column 20, Claim 17, Line 8, delete "programmable circuitry" and insert --controller--.
In Column 20, Claim 18, Line 14, delete "programmable circuitry" and insert --controller--.
In Column 20, Claim 19, Line 19, delete "programmable circuitry" and insert --controller--.

Signed and Sealed this
Thirteenth Day of August, 2024

Katherine Kelly Vidal
*Director of the United States Patent and Trademark Office*